United States Patent
Takemori et al.

(10) Patent No.: US 10,274,075 B2
(45) Date of Patent: Apr. 30, 2019

(54) HYDRAULIC CONTROL APPARATUS

(71) Applicant: Honda Motor Co., Ltd., Tokyo (JP)

(72) Inventors: Yuichiro Takemori, Wako (JP); Norihiro Akiyoshi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 136 days.

(21) Appl. No.: 15/438,681

(22) Filed: Feb. 21, 2017

(65) Prior Publication Data

US 2017/0254408 A1    Sep. 7, 2017

(30) Foreign Application Priority Data

Mar. 3, 2016  (JP) ................... 2016-040701

(51) Int. Cl.
    *F16H 57/04*    (2010.01)
    *F16H 61/00*    (2006.01)
    (Continued)

(52) U.S. Cl.
    CPC ..... *F16H 57/0446* (2013.01); *F16H 57/0435* (2013.01); *F16H 57/0443* (2013.01);
    (Continued)

(58) Field of Classification Search
    CPC ............. F16H 57/0446; F16H 57/0435; F16H 57/0443; F16H 59/18; F16H 59/44;
    (Continued)

(56) References Cited

U.S. PATENT DOCUMENTS

| 2009/0232673 A1* | 9/2009 | Reisch ............... F16H 57/0434 |
| | | 417/364 |
| 2010/0210414 A1* | 8/2010 | Tanaka ................. B60W 10/06 |
| | | 477/45 |

(Continued)

FOREIGN PATENT DOCUMENTS

| JP | 2014163457 A | 9/2014 |
| JP | 2015014342 A | 1/2015 |

(Continued)

OTHER PUBLICATIONS

Japanese Office Action; Application No. 2016-040701; dated Sep. 14.

(Continued)

*Primary Examiner* — Huan Le
(74) *Attorney, Agent, or Firm* — Duft & Bornsen, PC

(57) ABSTRACT

A hydraulic control apparatus for a vehicle including a first flow path leading oil discharged from a first hydraulic pump to a driving unit, a second flow path leading oil discharged from a second hydraulic pump to a lubrication unit, a flow path switching unit switching a flow path, and a controller controlling the flow path switching unit so as to lead the oil discharged from the second hydraulic pump to the first flow path when inoperation of an accelerator is detected and vehicle speed less than or equal to a predetermined value which is greater than 0 is detected, and to lead the oil discharged from the second hydraulic pump to the lubrication unit when operation of the accelerator is detected or vehicle speed greater than the predetermined value is detected.

8 Claims, 5 Drawing Sheets

(51) Int. Cl.
    *F16H 61/02*     (2006.01)
    *F16H 47/06*     (2006.01)
    *F16H 61/662*    (2006.01)
    *F16H 59/18*     (2006.01)
    *F16H 59/44*     (2006.01)
    *F16H 37/02*     (2006.01)

(52) U.S. Cl.
    CPC ..... F16H 61/0025 (2013.01); F16H 61/0031 (2013.01); F16H 61/0206 (2013.01); *F16H 37/022* (2013.01); *F16H 47/065* (2013.01); *F16H 59/18* (2013.01); *F16H 59/44* (2013.01); *F16H 61/662* (2013.01); *F16H 2061/0037* (2013.01)

(58) Field of Classification Search
    CPC ............. F16H 61/0025; F16H 61/0031; F16H 61/0206; F16H 61/662; F16H 2061/0037; F16H 57/04
    See application file for complete search history.

(56) References Cited

U.S. PATENT DOCUMENTS

2012/0011841 A1   1/2012  Ogata et al.
2015/0057858 A1*  2/2015  Nitta ........................ F01M 1/02
                                               701/22
2016/0245399 A1*  8/2016  Watanabe ........... F16H 61/0031

FOREIGN PATENT DOCUMENTS

WO     2010131345 A1   11/2010
WO     2013069101 A1   5/2013

OTHER PUBLICATIONS

Japanese Office Action; Application No. 2016-040701; dated Sep. 14, 2017.

\* cited by examiner

HYDRAULIC CONTROL APPARATUS

CROSS-REFERENCE TO RELATED APPLICATION

This application is based upon and claims the benefit of priority from Japanese Patent Application No. 2016-040701 filed on Mar. 3, 2016, the content of which is incorporated herein by reference.

BACKGROUND OF THE INVENTION

Field of the Invention

This invention relates to a hydraulic control apparatus for controlling a flow of hydraulic oil which is supplied to a power transmission mechanism.

Description of the Related Art

Conventionally, as an apparatus of this type is known as one that is equipped with a first hydraulic pump and a second hydraulic pump and controls flow of pressure oil supplied to an automatic transmission from these hydraulic pumps. For example, Japanese Unexamined Patent Publication No. 2014-163457 (JP2014-163457A) teaches an apparatus equipped with a first hydraulic pump driven by an engine and a second hydraulic pump driven by an electric motor, which during vehicle travel supplies oil discharged from the first pump to a hydraulic actuator for driving pulleys of a continuously variable transmission and during stopping of the engine by idling stop control supplies oil discharged from the second hydraulic pump to the hydraulic actuator.

However, in the apparatus described in JP2014-163457A, when the automatic transmission (for example, its pulley drive unit) requires pressure oil of large flow rate during vehicle travel, this requirement must be met solely by oil discharged from the first hydraulic pump, so that the first hydraulic pump tends to be large.

SUMMARY OF THE INVENTION

An aspect of the present invention is a hydraulic control apparatus for a vehicle, the vehicle including a prime mover and a power transmission mechanism, the power transmission mechanism including a driving unit driven by a hydraulic force and a lubrication unit to which a lubricating oil is supplied and being configured to transmit a torque output from the prime mover to a driving wheel in response to driving of the drive unit. The hydraulic control apparatus includes: a first hydraulic pump; a second hydraulic pump; a first flow path configured to lead an oil discharged from the first hydraulic pump to the driving unit; a second flow path configured to lead an oil discharged from the second hydraulic pump to the lubrication unit; a third flow path configured to lead the oil discharged from the second hydraulic pump to the first flow path; a flow path switching unit configured to switch a flow path so as to lead the oil discharged from the second hydraulic pump to the lubrication unit through the second flow path or to the first flow path through the third flow path; an operation detector configured to detect an operation or inoperation of an accelerator; a vehicle speed detector configured to detect a vehicle speed; and a controller configured to control the flow path switching unit so as to lead the oil discharged from the second hydraulic pump to the first flow path when the inoperation of the accelerator is detected by the operation detector and a vehicle speed less than or equal to a predetermined value which is greater than 0 is detected by the vehicle detector, and to lead the oil discharged from the second hydraulic pump to the lubrication unit when the operation of the accelerator is detected by the operation detector or a vehicle speed greater than the predetermined value is detected by the vehicle speed detector.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

First Embodiment

Figure 1:
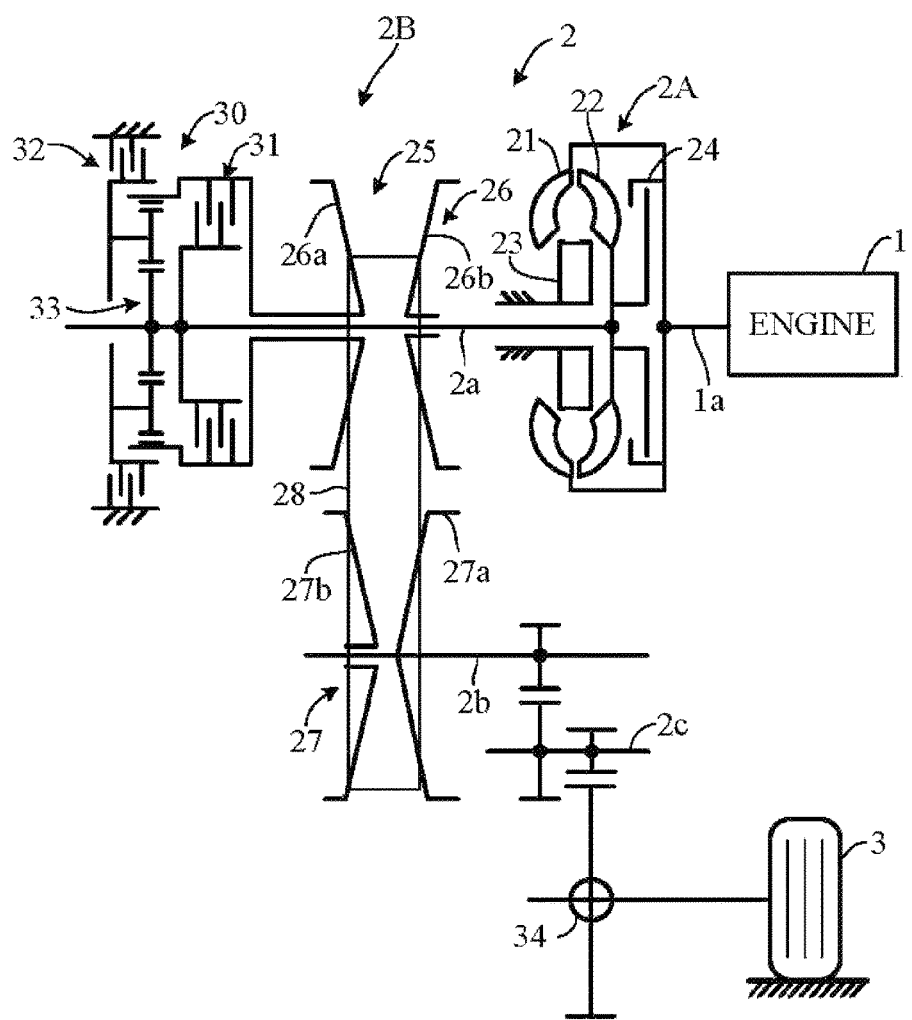
FIG. 1 is a diagram showing schematically part of a configuration of a vehicle power transmission system to which a hydraulic control apparatus according to a first embodiment of the present invention is applied.

Hereinafter, a first embodiment of the present invention is explained with reference to FIGS. 1 to 4. FIG. 1 is a diagram schematically illustrating a vehicle power transmission system to which a hydraulic control apparatus according to a first embodiment of the present invention is applied. As seen in FIG. 1, torque of an engine 1 is transmitted through a power transmission mechanism 2 to drive wheels 3. The power transmission mechanism 2 includes a torque converter 2A and a transmission 2B.

The torque converter 2A has a pump impeller 21 connected to an output shaft 1a (crankshaft) of the engine 1, a turbine runner 22 connected to a main shaft 2a of the transmission 2B, a stator 23 installed between the pump impeller 21 and the turbine runner 22, and a lockup clutch 24 which in an engaged state directly connects the pump impeller 21 and the turbine runner 22 and in a disengaged state disconnects the direct connection.

The transmission 2B has a continuously variable transmission mechanism (CVT) 25 and a forward reverse changing mechanism 30. The continuously variable transmission mechanism 25 has a drive pulley 26 deployed along a main shaft 2a, a driven pulley 27 deployed along a counter shaft 2b parallel to the main shaft 2a, and an endless belt 28 which is wound around the drive pulley 26 and driven pulley 27 and transmits torque between the pulleys 26 and 27.

The drive pulley 26 includes a fixed pulley half 26a fitted on the main shaft 2a to be incapable of relative rotation and to be incapable of relative axial direction movement, and a movable pulley half 26b fitted on the main shaft 2a to be incapable of relative rotation and to be capable of relative movement in the axial direction with respect to the fixed pulley half 26a. The driven pulley 27 includes a fixed pulley half 27a fitted on the countershaft 2b to be incapable of relative rotation and to be incapable of relative axial movement, and a movable pulley half 27b fitted on the counter shaft 2b to be incapable of relative rotation and to be capable of relative movement in the axial direction with respect to the fixed pulley half 27a. The movable pulley halves 26b and 27b are driven by hydraulic force, thereby varying groove width of the pulleys 26 and 27 and enabling the transmission 2B to continuously vary speed ratio.

The forward reverse changing mechanism 30 includes a forward clutch 31, a reverse brake clutch 32, and a planetary gear unit 33. A sun gear of the planetary gear unit 33 is fixed on the main shaft 2a, and a ring gear is fixed on the fixed pulley half 26a of the drive pulley 26 through the forward clutch 31. A pinion is installed between the sun gear and the ring gear of the planetary gear unit 33, and the pinion is connected to the reverse brake clutch 32 through a carrier.

The forward clutch 31 and the reverse brake clutch 32 are engaged and disengaged individually by hydraulic force. When the forward clutch 31 is engaged and the reverse brake clutch 32 is disengaged, the drive pulley 26 is driven forward in the same direction as the main shaft 2a. When the forward clutch 31 is disengaged and the reverse brake clutch 32 is engaged, the drive pulley 26 is driven in reverse in the opposite direction from the main shaft 2a. When the forward clutch 31 is disengaged and the reverse brake clutch 32 is disengaged, power transmission through the forward reverse changing mechanism 30 to the drive pulley 26 is cut off.

Rotation of the countershaft 2b is transmitted through gears to a secondary shaft 2c. Rotation of the secondary shaft 2c is transmitted through gears and a differential mechanism 34 to the drive wheels 3, causing the vehicle to travel.

Figure 2:
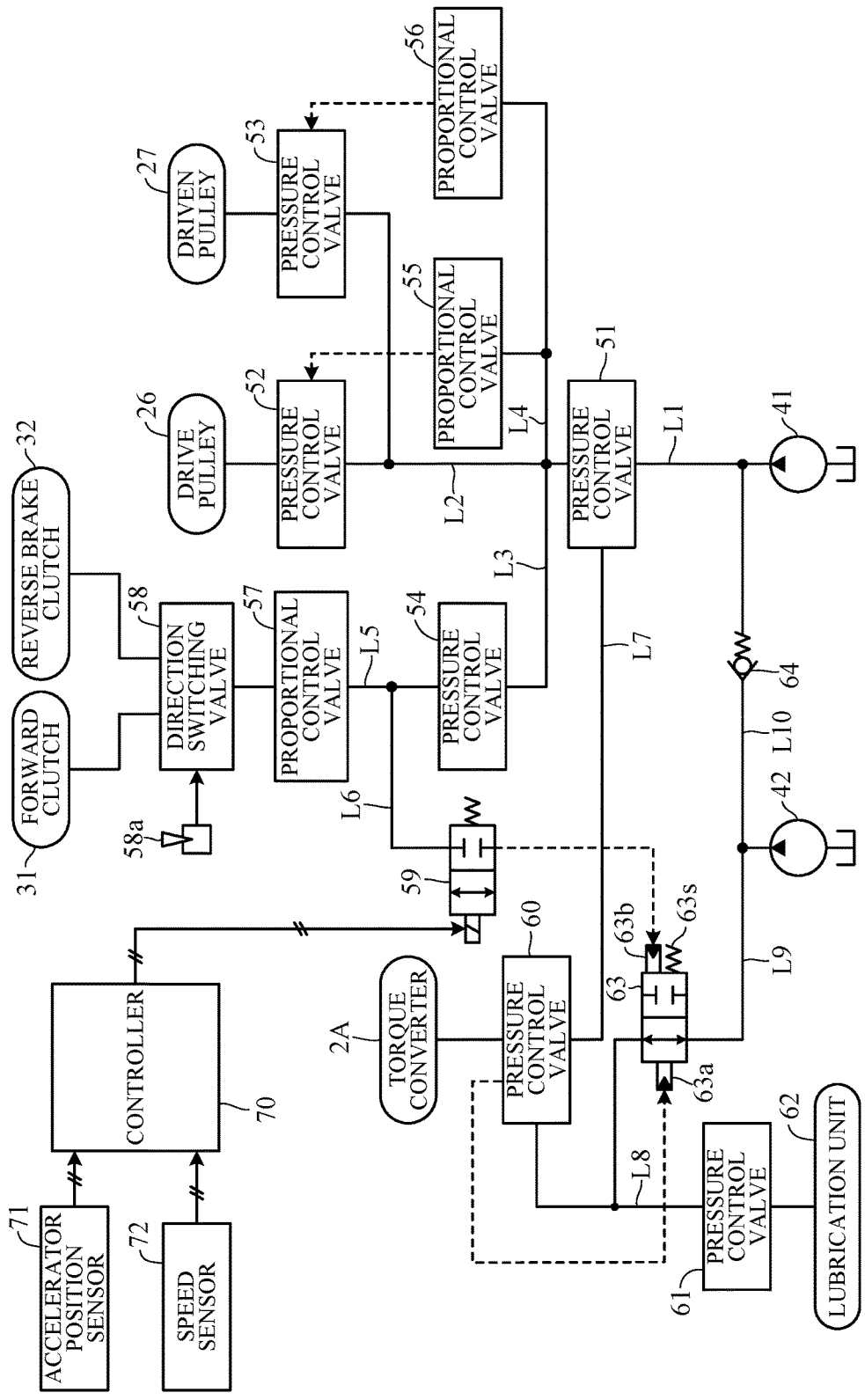
FIG. 2 is a hydraulic circuit diagram showing a configuration of the hydraulic control apparatus according to the first embodiment of the present invention.

FIG. 2 is a hydraulic circuit diagram showing the configuration of a hydraulic control apparatus according to the first embodiment of the present invention. The hydraulic control apparatus includes a pair of hydraulic pumps (first hydraulic pump 41 and second hydraulic pump 42) driven by the engine 1.

Figure 3:
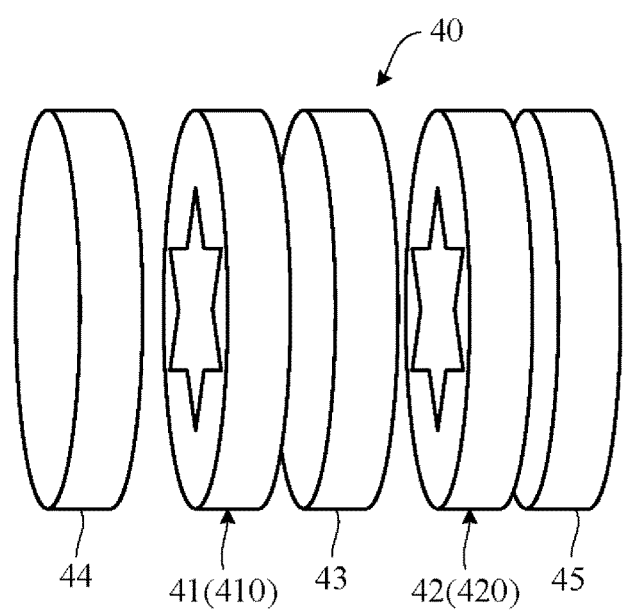
FIG. 3 is a diagram showing schematically a configuration of a hydraulic pump in FIG. 2.

FIG. 3 is a diagram illustrating schematically a configuration of the hydraulic pumps 41 and 42. The hydraulic pumps 41 and 42 are two-rotor gear pumps integrated as a pump unit 40. FIG. 3 omits illustration of a number of components, including a case of the pump unit 40, a rotating shaft connected to the engine 1, a suction port for sucking oil into the pump unit 40, and discharge ports for discharging oil from the pump unit 40.

As shown in FIG. 3, the pump unit 40 includes a first rotor 410 constituting part of the first hydraulic pump 41 and a second rotor 420 constituting part of the second hydraulic pump 42. A plate 43 is sandwiched between the first rotor 410 and the second rotor 420, and the first rotor 410, second rotor 420 and plate 43 are positioned between a base 44 and a cover 45. The first rotor 410 and second rotor 420 include inner gears rotationally driven by power of the engine 1 and outer gears located around the inner gears. Rotation of the inner gears successively changes volume of oil spaces between the inner gears and the outer gears, whereby hydraulic pressures are discharged from the hydraulic pumps 41 and 42. The first hydraulic pump 41 is sometimes called "main pump" and the second hydraulic pump 42 is sometimes called "sub-pump".

As shown in FIG. 2, oil discharged from the first hydraulic pump 41 is led through an oil passage L1 to a pressure control valve 51 and regulated to a predetermined set pressure by the pressure control valve 51. The pressure-regulated oil is led to pressure control valves 52 and 53 through an oil passage L2, to a pressure control valve 54 through an oil passage L3, and to proportional solenoid valves 55 and 56 through an oil passage L4. The proportional solenoid valves 55 and 56 are normally open proportional electromagnetic pressure-reducing valves whose output pressures are maximum when their solenoids are de-energized and output pressures decrease with increasing energizing current to the solenoids.

Output pressures of the proportional solenoid valves 55 and 56 act respectively on the pressure control valves 52 and 53 as pilot pressures, and the pressure control valves 52 and 53 regulate (reduce) hydraulic pressures in accordance with the pilot pressures. Hydraulic pressure regulated by the pressure control valve 52 is led to an oil chamber for driving the movable pulley half 26b of the drive pulley 26, where it produces pulley side pressure. Hydraulic pressure regulated by the pressure control valve 53 is led to an oil chamber for driving the movable pulley half 27b of the driven pulley 27, where it produces pulley side pressure.

Hydraulic pressure led to the pressure control valve 54 is pressure-regulated (reduced) to a predetermined set pressure and output to an oil passage L5. A proportional solenoid valve (proportional solenoid pressure-reduction valve) 57 which outputs hydraulic pressure in accordance with solenoid energization current is connected to the oil passage L5, and hydraulic pressure regulated (reduced) by the proportional solenoid valve 57 is led to a direction switching valve 58. The direction switching valve 58 is switched in accordance with operation of a shifter 58a, and switching of the direction switching valve 58 switches flow of hydraulic pressure to the forward clutch 31 and the reverse brake clutch 32. The shifter 58a is an operation member manipulated by a driver, which can be operated to select a shift range from among, for example, P, R, N, D, S and L.

The oil passage L5 between the pressure control valve 54 and the proportional solenoid valve 57 is connected through an oil passage L6 to a solenoid valve 59. The solenoid valve 59 is a normally closed electromagnetic on-off valve which opens when its solenoid is energized and closes when it is de-energized. The solenoid valve 59 outputs pilot pressure to a switching valve 63 when opened and terminates output of the pilot pressure when closed.

Surplus pressure oil discharged from the pressure control valve 51 is led through an oil passage L7 to a pressure control valve 60. The pressure oil led to the pressure control valve 60 is pressure-regulated (reduced) to a predetermined set pressure and used as hydraulic oil by the lockup clutch 24 of the torque converter 2A (FIG. 1). Surplus pressure discharged from the pressure control valve 60 is led through an oil passage L8 to a pressure control valve 61. The pressure oil led to the pressure control valve 61 is pressure-regulated (reduced) to a predetermined set pressure and supplied to a lubrication unit 62. "Lubrication unit 62" is used here as a general term for places requiring supply of lubricating oil (rotating portions, sliding portions and the like).

Oil discharged from the second hydraulic pump 42 is led through an oil passage L9 to the switching valve 63 and is also led through an oil passage L10 to a check valve 64. The check valve 64, which is connected to the oil passage L1 downstream of the first hydraulic pump 41, blocks flow of pressure oil from the oil passage L1 to the oil passage L10 and allows flow of pressure oil from the oil passage L10 to the oil passage L1 when pressure in the oil passage L10 is equal to or greater than a predetermined value.

The switching valve 63 is a pilot type on-off valve which switches between an open position and a closed position in response to pilot pressures acting on pilot ports 63a and 63b. Output pressure regulated by the pressure control valve 60 acts on the pilot port 63a as pilot pressure against, biasing force of a spring 63s. On the other hand, pilot pressure output from the solenoid valve 59 acts on the pilot port 63b on the opposite side.

When pilot pressure is not acting on either of the pilot ports 63a and 63b, the switching valve 63 is switched to closed position by biasing force of the spring 63s. Next, when pilot pressure from the pressure control valve 60 acts on the pilot port 63a with the solenoid valve 59 in a state switched to closed position, the switching valve 63 switches to open position. This communicates the oil passage L9 and the oil passage L8, so that low-pressure oil discharged from the second hydraulic pump 42 is led through the switching valve 63 and the pressure control valve 61 to the lubrication unit 62. This pump discharge mode is called "low mode" hereinafter.

On the other hand, when the solenoid valve 59 is switched to open position and pilot pressure acts on the pilot port 63b, the switching valve 63 switches to closed position. This cuts off communication between the oil passage L9 and oil passage L8, whereupon oil having risen to high pressure discharged from the second hydraulic pump 42 merges into the oil passage L1 through the check valve 64. As a result, quantity of pressure oil for driving the pulleys 26, 27, clutches 31, 32 and the like increases, so that the power transmission mechanism 2 can act rapidly (for example, promptly driving the pulleys 26 and 27 to low position). This pump discharge mode is called "high mode" hereinafter.

Switching from low mode to high mode and from high mode to low mode is performed by switching of the switching valve 63. However, frequent occurrence of this switching may degrade durability of the pump unit 40 (FIG. 3) because it repeatedly places a load on the pump unit 40. In addition, there is also a danger of durability of the switching valve 63 and/or solenoid valve 59 being impaired. Therefore, the present embodiment is adapted to control the solenoid valve 59 so as to hold switching frequency of the switching valve 63 to the minimum necessary.

The solenoid valve 59 is controlled by a control signal output from a controller 70. The controller 70 receives signals from an accelerator position sensor 71 which detects accelerator position corresponding to amount of accelerator pedal depression and from a vehicle speed sensor 72 which detects vehicle travel speed.

The controller 70 is configured to include an arithmetic processing unit including a CPU, ROM, RAM, peripheral circuitry and the like. The controller 70 performs predetermined processing based on signals from the sensors 71 and 72 in accordance with a program stored in memory beforehand and outputs control signals to a solenoid of the solenoid valve 59.

Figure 4:
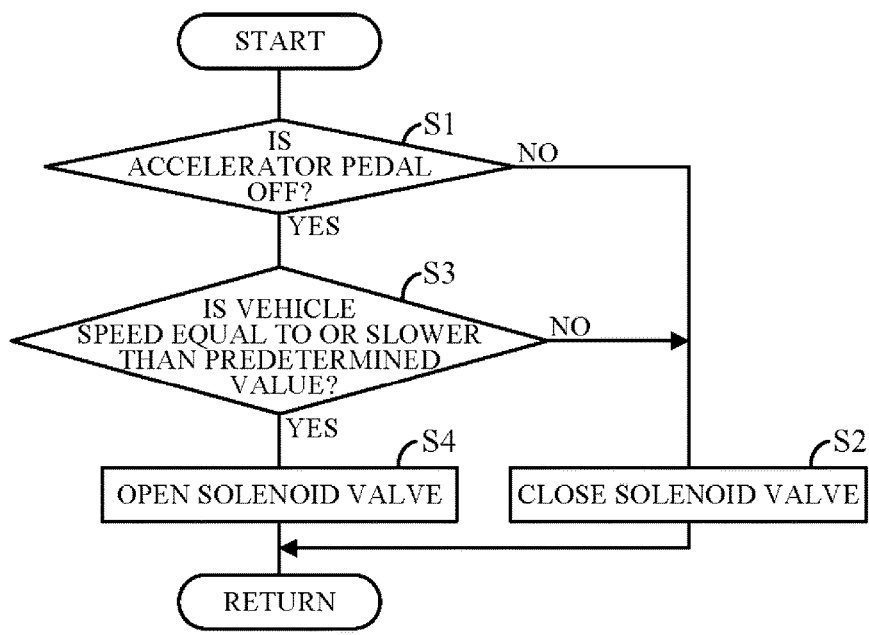
FIG. 4 is a flowchart showing an example of processing performed by a controller in FIG. 2.

FIG. 4 is a flowchart showing an example of processing performed by the controller 70. The processing shown in this flowchart is, for example, started when an engine key switch is turned ON and thereafter repeatedly executed periodically at predetermined time intervals. The pulleys 26 and 27 are driven by control signals output from the controller 70 to the proportional solenoid valves 55 and 56 in accordance with characteristics defined in advance, for example, so as to establish a speed ratio corresponding to accelerator position and vehicle speed, but further explanation of this aspect is omitted.

First, in S1, whether the accelerator pedal is OFF (inoperative), i.e., whether the driver is demanding deceleration, is determined based on the signal from the accelerator position sensor 71 (S: processing Step). When it is determined that the accelerator pedal is ON (in operation) in S1, the program goes to S2, in which the solenoid of the solenoid valve 59 is de-energized, thereby switching the solenoid valve 59 to closed position. Namely, in this case the pump discharge mode is set to low mode and oil discharged by the second hydraulic pump 42 is used for lubrication. Load on the second hydraulic pump 42 is reduced when low mode is set.

On the other hand, when it is determined that the accelerator pedal is OFF in S1, the program goes to S3, in which whether vehicle speed is equal to or slower than a predetermined value V1 which is greater than 0 is determined based on the signal from the speed sensor 72. This is for deciding whether pulley side pressure of large flow rate is necessary for driving the pulleys 26 and 27 to low position to obtain maximum speed ratio. To explain further, in a state where vehicle speed has become 0, the pulleys 26 and 27 must be driven to low position in preparation for start of moving of vehicle, and in order to achieve prompt start of vehicle, it is desirable that the pulleys 26 and 27 are moved to the low position before vehicle speed becomes 0. Therefore, pulley side pressure of large flow rate is necessary for driving the pulleys 26 and 27 to the low position before vehicle speed becomes 0. In this case, therefore, it is decided that pump discharge mode should be high mode.

In other words, when vehicle speed is fast, time until vehicle speed reaches 0 after the accelerator pedal goes OFF is relatively long, so even if high mode is not implemented at this time, a margin of time remains for driving the pulleys 26 and 27 to low position before vehicle speed becomes 0. To the contrary, when vehicle speed is slow, time until vehicle speed reaches 0 after the accelerator pedal goes OFF is short, so unless high mode is switched to promptly, it may become impossible to drive the pulleys 26 and 27 to low position before vehicle speed becomes 0. In consideration of this matter, predetermined value V1 is set to a speed that ensures enough time for supplying adequate pulley side pressure before vehicle speed reaches 0 even if rapid deceleration from that speed (V1) should occur, for example, to around 60 km/h.

When it is determined that vehicle speed is faster than predetermined value V1 in S3, pulley side pressure of large flow rate is not necessary, so the program goes to S2. As a result, pump discharge mode is maintained in low mode. On the other hand when it is determined in S3 that vehicle speed is equal to or slower than predetermined value V1, the program goes to S4, in which the solenoid of the solenoid valve 59 is energized to switch the solenoid valve 59 to open position. As a result, pump discharge mode is switched to high mode, and oil discharged from the second hydraulic pump 42 is led through the check valve 64 to the oil passage L1. Therefore, adequate pulley side pressure can be generated, so that the pulleys 26 and 27 can be promptly switched to low position before the vehicle stops.

The first embodiment of the present invention can achieve advantages and effects such as the following:

(1) The hydraulic control apparatus is applied to a vehicle equipped on-board with the engine 1 and with the power transmission mechanism 2, which includes the drive units such as pulleys 26 and 27 driven by hydraulic force, and the lubrication unit 62 requiring supply of lubricating oil, and which transmits torque of the engine 1 to the drive wheels 3 in response to driving of the drive units (FIGS. 1 and 2). This hydraulic control apparatus includes: the first hydraulic pump 41 and the second hydraulic pump 42; the oil passage L1 and others which lead oil discharged from the first hydraulic pump 41 to the drive units such as pulleys 26 and 27; the oil passage L9 and others which lead oil discharged from the second hydraulic pump 42 to the lubrication unit 62; the oil passage L10 which leads oil discharged from the second hydraulic pump 42 to the oil passage L1; the solenoid valve 59 and the switching valve 63 which switch flow path to lead oil discharged from the second hydraulic pump 42 through the oil passage L9 to the lubrication unit 62 or through the oil passage L10 to the oil passage L1 downstream of the first hydraulic pump 41; the accelerator position sensor 71 which detects operation of the accelerator pedal; the speed sensor 72 which detects vehicle speed; and the controller 70 which controls the solenoid valve 59 to lead oil discharged from the second hydraulic pump 42 to the oil passage L1 when the accelerator position sensor 71 detects inoperation of the accelerator pedal and the speed sensor 72 detects vehicle speed equal to or slower than predetermined value V1 which is greater than 0 (high mode), and to lead oil discharged from the second hydraulic pump 42 to the lubrication unit 62 when the accelerator position sensor 71 detects operation of the accelerator pedal and the speed sensor 72 detects vehicle speed faster than predetermined value V1 (low mode) (FIG. 2).

So when pump discharge mode is high mode, oil discharged from the second hydraulic pump 42 merges with oil discharged from the first hydraulic pump 41, whereby adequate quantity of pressure oil necessary for driving the power transmission mechanism 2 can be supplied without enlarging the first hydraulic pump 41. Moreover, since pump discharge mode is switched to high mode on condition of the accelerator pedal being OFF and vehicle speed being equal to or slower than predetermined value V1, frequency of switching the solenoid valve 59 and the switching valve 63 can be reduced compared to that in, for example, a configuration that switches to high mode solely on condition of the accelerator pedal being OFF. As a result, pump discharge mode is not switched to high mode more often than necessary, so that durability of the pump unit 40, solenoid valve 59 and switching valve 63 can be prolonged. In other words, pressure oil of large flow rate can be easily supplied to the power transmission mechanism 2 with optimal timing.

(2) The power transmission mechanism 2 includes the transmission 2B which outputs torque input from the engine 1 in response to driving of the drive units while changing rotation speed of the counter shaft 2b, the transmission 2B includes the continuously variable transmission mechanism 25 which transmits torque through the endless belt 2, and the drive units include the pulleys 26 and 27 whose grooves wound with the endless belt 28 are variable in width (FIG. 2). The hydraulic control apparatus of the present embodiment can be advantageously utilized in the transmission 2B having the continuously variable transmission mechanism 25 because the need to prepare for a vehicle start by increasing quantity of pressure oil for driving the pulleys 26 and 27 to low position is particularly high in this case.

(3) The first hydraulic pump 41 and the second hydraulic pump 42 are individually driven by the engine 1 (FIG. 3). The configuration of the apparatus is therefore simplified because no electric motors or other additional components are required for driving the hydraulic pumps 41 and 42.

Second Embodiment

A second embodiment of the present invention will be explained with reference to FIGS. 5 and 6. Mainly points of difference from the first embodiment are explained in the following. The second embodiment differs from the first embodiment in the configuration of the hydraulic control apparatus related to switching of the solenoid valve 59. Specifically, while in the first embodiment opening and closing of the solenoid valve 59 is controlled based on accelerator pedal operation and vehicle speed, in the second embodiment opening and closing of the solenoid valve 59 is controlled based also on other parameters than these.

Figure 5:
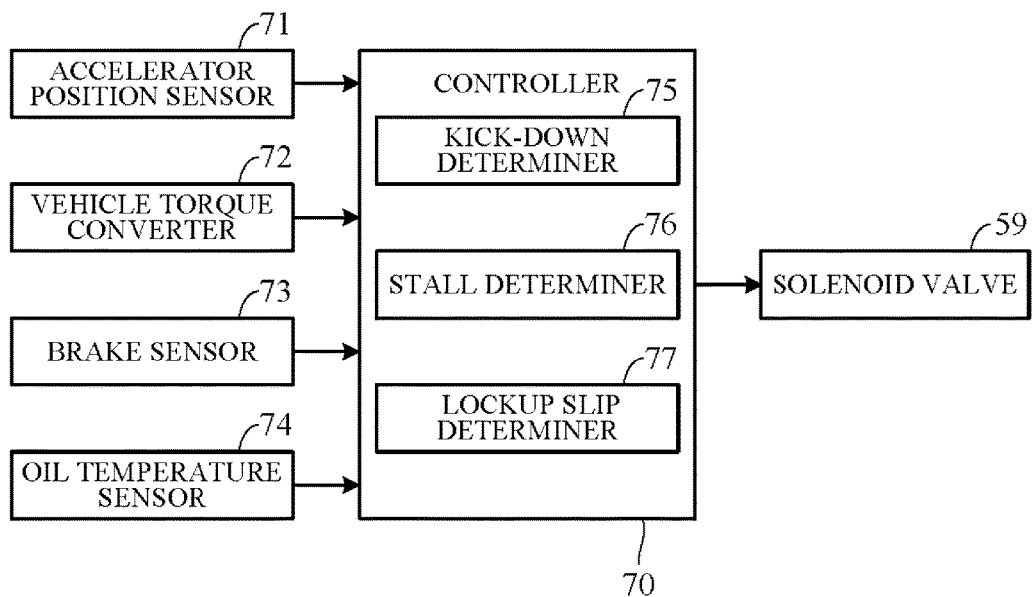
FIG. 5 is a block diagram showing a control structure of a hydraulic control apparatus according to a second embodiment of the present invention.

FIG. 5 is a block diagram showing a control structure of the hydraulic control apparatus according to the second embodiment of the present invention. Constituents in common with those of FIG. 2 are assigned the like reference symbols. As shown in FIG. 5, the controller 70 receives signals not only from the accelerator position sensor 71 and speed sensor 72 but in addition signals from a brake sensor 73 which detects operation of a brake pedal and an oil temperature sensor 74 which detects oil temperature. As functional constituents, the controller 70 includes a kick-down determiner 75, a stall determiner 76, and a lockup slip determiner 77.

Figure 6:
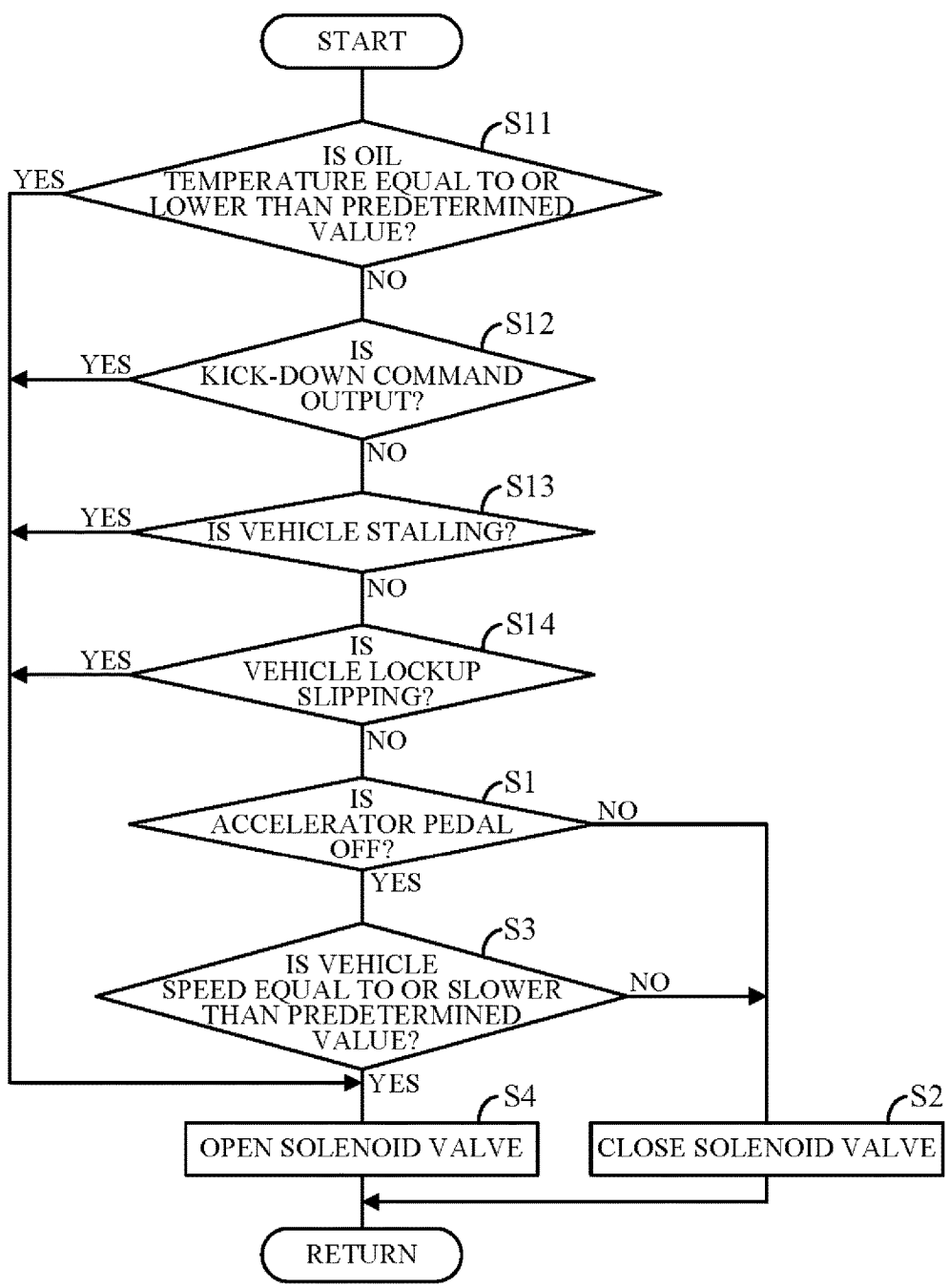
FIG. 6 is a flowchart showing an example of processing performed by a controller in FIG. 5.

FIG. 6 is a flowchart showing an example of processing executed in the controller 70 of FIG. 5. Steps which perform the same processing as in FIG. 4 are assigned like reference symbols. As shown in FIG. 6, first, in S11 of the second embodiment, whether oil temperature is equal to or lower than a predetermined value T1 is judged based on a signal from the oil temperature sensor 74. When it is determined that oil temperature is equal to or lower than predetermined value T1 in S11, the program goes to S4, and when it is determined to be higher than predetermined value T1, goes to S12.

In S12, whether a kick-down command is output is judged by the kick-down determiner 75. The kick-down is a speed shift control for down-shifting from the current gear position to the lower gear position of the transmission 2B when the driver steps down hard on the accelerator pedal. Presence or absence of a kick-down command is, for example, judged based signals from the accelerator position sensor 71 and the speed sensor 72. When it is determined that a kick-down command is output in FIG. 12, the program goes to S4, and when determined not to be output, goes to S13.

In S13, whether the vehicle is stalling is judged by the stall determiner 76. Stalling means that vehicle speed is 0 despite the accelerator pedal position being full open. Stalling occurs, for example, when the accelerator pedal and the brake pedal are simultaneously pushed down on a steep uphill slope or similar. Determination of whether stalling or not is performed based on signals from the accelerator position sensor 71, the speed sensor 72, and the brake sensor 73. When presence of stalling is determined in S13, the program goes to S4, and when determined not to be present, goes to S14.

In S14, whether the vehicle is experiencing lockup slipping is judged in the lockup slip determiner 77. Lock-slipping means a state in which the lockup clutch 24 starts to operate after a command to connect the lockup clutch 24 and lockup is not fully completed. Whether lockup slipping is present is performed based on signals from, inter alia, the accelerator position sensor 71 and the speed sensor 72. When presence of lockup slipping is determined in S14, the program goes to S4, and when determined not to be present, goes to S1. Subsequently, processing the same as in FIG. 4 is performed.

Thus in the second embodiment, when any condition is determined among oil temperature being equal to or lower than predetermined value T1, kick-down command being output, stalling being present, and lockup slipping being present, the solenoid valve 59 is switched to open position regardless of accelerator pedal operation and vehicle speed. In such a case, therefore, pump discharge mode is switched to high mode even a state of the accelerator position sensor 71 having detected accelerator pedal operation or a state of the speed sensor 72 having detected vehicle speed faster than predetermined value V1.

The second embodiment can achieve advantages and effects such as the following:

(1) The hydraulic control apparatus further includes the oil temperature sensor 74 (oil temperature detector) which detects oil temperature, and when oil temperature detected by the oil temperature sensor 74 is equal to or lower than predetermined value T1, the controller 70 controls the solenoid valve 59 to lead oil discharged from the second hydraulic pump 42 to the oil passage L1 downstream of the first hydraulic pump 41 even if the accelerator position sensor 71 detects accelerator operation or the speed sensor 72 detects vehicle speed faster than predetermined value V1 (S11→S4). Such switching of pump discharge mode to high mode in response to oil temperature increases quantity of pressure oil supplied to the power transmission mechanism 2 when its operation is inhibited by low oil temperature, thereby ensuring that the power transmission mechanism 2 can be easily operated.

(2) The hydraulic control apparatus further includes the kick-down determiner 75 which determines whether a kick-down command is output, and when the kick-down determiner 75 determines output of a kick-down command, the controller 70 controls the solenoid valve 59 to lead oil discharged from the second hydraulic pump 42 to the oil passage L1 downstream of the first hydraulic pump 41 even if the accelerator position sensor 71 detects accelerator operation or the speed sensor 72 detects vehicle speed faster than predetermined value V1 (S12→S4). Such switching of pump discharge mode to high mode when it is determined that a kick-down command is output enables the kick-down to be promptly achieved.

(3) The hydraulic control apparatus further includes the stall determiner 76 which determines whether the vehicle is stalling, and when the stall determiner 76 determines presence of stalling, the controller 70 controls the solenoid valve 59 to lead oil discharged from the second hydraulic pump 42 to the oil passage L1 downstream of the first hydraulic pump 41 even if the accelerator position sensor 71 detects accelerator operation or the speed sensor 72 detects vehicle speed faster than predetermined value V1 (S13→S4). Such switching of pump discharge mode to high mode upon vehicle stalling easily ensures that vehicle starts moving.

(4) The hydraulic control apparatus further includes the lockup slip determiner 77 which determines whether the vehicle is experiencing lockup slipping, and when the lockup slip determiner 77 determines presence of lockup slipping, the controller 70 controls the solenoid valve 59 to lead oil discharged from the second hydraulic pump 42 to the oil passage L1 downstream of the first hydraulic pump 41 even if the accelerator position sensor 71 detects accelerator operation or the speed sensor 72 detects vehicle speed faster than predetermined value V1 (S14→S4). Such switching of pump discharge mode to high mode upon vehicle lockup slipping enables stable lockup operation to be promptly achieved.

In the above embodiments, although the endless belt 28 is wound around the pulleys 26 and 27, some other belt-like power transmission member such as an endless chain can be wound around instead. In the above embodiments, although the first hydraulic pump 41 and the second hydraulic pump 42 are integrally constituted as gear pumps by the pump unit 40, and the hydraulic pumps 41 and 42 are independently driven by the engine 1 (prime mover), the hydraulic pumps are not limited to this configuration. In the above embodiments, oil discharged from the first hydraulic pump 41 is led through the oil passage L1 (first flow path) to the pulleys 26 and 27 and other drive units and oil discharged from the second hydraulic pump 42 is, by switching of the switching valve 63, led through the oil passage L9 (second flow path) to the lubrication unit 62 or through the oil passage L10 (third flow path) to the oil passage L1. However, the hydraulic circuit is not limited to this configuration.

In the above embodiments, although the switching valve 63 is switched by pilot pressure from the solenoid valve 59, the switching valve can instead be switched by an electric signal rather than by pilot pressure, and the flow path switching unit is not limited to the above configuration. For example, the flow path switching unit can be constituted using an electromagnetic direction switching valve and flow path be switched by the direction switching valve so that oil discharged from the second hydraulic pump 42 flows to the lubrication unit 62 or to the oil passage L1 downstream of the first hydraulic pump 41. In the above embodiments, the switching valve 63 is switched by the controller 70 open-close controlling the solenoid valve 59 in response to accelerator pedal operation and vehicle speed. However, the controller 70 serving as the control unit is not limited to the above configuration. In the above embodiments, although operation or inoperation of an accelerator pedal (an accelerator) is detected by the accelerator position sensor 71, an operation detector is not limited to this configuration. In the above embodiments, although vehicle speed is detected by the speed sensor 72, a vehicle speed detector is not limited to this configuration.

In the above embodiments, although the hydraulic control apparatus is applied to a vehicle equipped with the transmission 2B having the continuously variable transmission mechanism 25, the transmission is not limited to this configuration and can instead be a stepped automatic transmission, for example. Therefore, drive units driven by hydraulic force can be ones other than the pulleys 26 and 27.

The above embodiment can be combined as desired with one or more of the aforesaid modifications. The modifications can also be combined with one another.

According to the present invention, when an inoperation of an accelerator is detected and a vehicle speed less than or equal to a predetermined value is detected, oil discharged from a second hydraulic pump is led to a first flow path downstream of a first hydraulic pump. Therefore, adequate quantity of pressure oil necessary for driving a power transmission mechanism can be supplied without enlarging the first hydraulic pump.

Above, while the present invention has been described with reference to the preferred embodiments thereof, it will be understood, by those skilled in the art, that various changes and modifications may be made thereto without departing from the scope of the appended claims.

What is claimed is:

1. A hydraulic control apparatus for a vehicle, the vehicle comprising a prime mover and a power transmission, the power transmission comprising a drive pulley driven by a hydraulic force and being configured to transmit a torque output from the prime mover to a driving wheel in response to driving of the drive pulley, the hydraulic control apparatus comprising:
   a first hydraulic pump;
   a second hydraulic pump;
   a first flow path configured to lead an oil discharged from the first hydraulic pump to the drive pulley;

a second flow path configured to lead an oil discharged from the second hydraulic pump to portions of the power transmission that require a supply of lubricating oil;

a third flow path configured to lead the oil discharged from the second hydraulic pump to the first flow path;

at least one valve configured to switch a flow path so as to lead the oil discharged from the second hydraulic pump to the second flow path, or to the first flow path through the third flow path;

an operation detector configured to detect accelerator position;

a vehicle speed detector configured to detect a vehicle speed; and a controller configured to control the at least one valve so as to lead the oil discharged from the second hydraulic pump to the first flow path when the accelerator is in an inoperative position as detected by the operation detector and the vehicle speed is less than or equal to a predetermined value which is greater than 0 as detected by the vehicle speed detector, and to lead the oil discharged from the second hydraulic pump to the second flow path when the accelerator is in an operation position as detected by the operation detector or the vehicle speed is greater than the predetermined value as detected by the vehicle speed detector.

2. The hydraulic control apparatus according to claim 1, wherein the power transmission comprises a transmission configured to output the torque input from the prime mover in response to driving of the drive pulley while changing a rotation speed and, the transmission comprises a continuously variable transmission configured to transmit a torque through an endless belt wound around the drive pulley, wherein a width of a groove of the drive pulley is changeable.

3. The hydraulic control apparatus according to claim 1, wherein the first and second hydraulic pumps are driven by the prime mover.

4. The hydraulic control apparatus according to claim 1, further comprising an oil temperature detector configured to detect an oil temperature, wherein
the controller controls the at least one valve so as to lead the oil discharged from the second hydraulic pump to the first flow path when the oil temperature detected by the oil temperature detector is lower than or equal to a predetermined value even if the accelerator is in an operation position as detected by the operation detector or even if the vehicle speed is greater than the predetermined value as detected by the vehicle speed detector.

5. The hydraulic control apparatus according to claim 1, further comprising a kick-down determiner configured to determine if a kick-down command is output, wherein
the controller controls the at least one valve so as to lead the oil discharged from the second hydraulic pump to the first flow path when it is determined by the kick-down determiner that the kick-down command is output even if the accelerator is in an operation position as detected by the operation detector or even if the vehicle speed is greater than the predetermined value as detected by the vehicle speed detector.

6. The hydraulic control apparatus according to claim 1, wherein the at least one valve comprises a switching valve provided in the second flow path and configured to switch in response to a pilot pressure and a solenoid valve switched by a control signal output from the controller, and is configured so that an oil having passed through the first flow path is supplied to a pilot port of the switching valve in response to switching of the solenoid valve.

7. The hydraulic control apparatus according to claim 6, wherein the at least one valve further comprises a check valve provided in the third flow path and configured to block flow of an oil from the first flow path to the second flow path and to allow flow of an oil from the second flow path to the first flow path when pressure in the third flow path is greater than or equal to a predetermined value.

8. The hydraulic control apparatus according to claim 1, wherein
the power transmission comprises a transmission configured to output the torque input from the prime mover in response to driving of the drive pulley while changing a rotation speed, the transmission comprises a continuously variable transmission configured to transmit a torque through an endless belt wound around the drive pulley, and a width of a groove of the drive pulley is changeable,
the first and second hydraulic pumps are driven by the prime mover, and
the controller controls the at least one valve so as to lead the oil discharged from the second hydraulic pump to the first flow path so that a quantity of oil supplied to the drive pulley increases when the accelerator is in the inoperative position as detected by the operation detector and the vehicle speed is less than or equal to a predetermined value which is greater than 0 as detected by the vehicle speed detector, and to lead the oil discharged from the second hydraulic pump to the second flow path when the accelerator is in the operation position as detected by the operation detector or the vehicle speed is greater than the predetermined value as detected by the vehicle speed detector.

* * * * *